US009200085B2

(12) United States Patent
Lin et al.

(10) Patent No.: US 9,200,085 B2
(45) Date of Patent: Dec. 1, 2015

(54) SOLVENT USED FOR DISSOLVING POLYSACCHARIDE AND METHOD FOR MANUFACTURING MOLDED ARTICLE AND POLYSACCHARIDE DERIVATIVE USING THIS SOLVENT

(75) Inventors: Lianzhen Lin, Kyoto (JP); Hideki Yamaguchi, Kyoto (JP); Kaname Tsuchii, Kyoto (JP)

(73) Assignee: KRI, INC., Kyoto (JP)

( * ) Notice: Subject to any disclaimer, the term of this patent is extended or adjusted under 35 U.S.C. 154(b) by 0 days.

(21) Appl. No.: 14/006,595

(22) PCT Filed: Mar. 22, 2012

(86) PCT No.: PCT/JP2012/057321
§ 371 (c)(1),
(2), (4) Date: Sep. 20, 2013

(87) PCT Pub. No.: WO2012/128315
PCT Pub. Date: Sep. 27, 2012

(65) Prior Publication Data
US 2014/0024823 A1    Jan. 23, 2014

(30) Foreign Application Priority Data

Mar. 23, 2011 (JP) ................. 2011-063965
Oct. 26, 2011 (JP) ................. 2011-234659

(51) Int. Cl.
| | |
|---|---|
| C08J 3/09 | (2006.01) |
| C08B 30/00 | (2006.01) |
| C08B 37/00 | (2006.01) |
| C08B 15/02 | (2006.01) |
| C08K 5/19 | (2006.01) |
| C08B 1/00 | (2006.01) |
| C08B 3/06 | (2006.01) |
| C08B 3/08 | (2006.01) |
| C08B 37/08 | (2006.01) |
| C08L 1/02 | (2006.01) |
| C08L 3/02 | (2006.01) |
| C08L 5/08 | (2006.01) |
| C08L 5/14 | (2006.01) |
| D01F 2/02 | (2006.01) |
| C09K 3/00 | (2006.01) |
| C08J 7/04 | (2006.01) |
| C08B 16/00 | (2006.01) |
| C08B 37/14 | (2006.01) |

(52) U.S. Cl.
CPC ............ *C08B 15/02* (2013.01); *C08B 1/003* (2013.01); *C08B 3/06* (2013.01); *C08B 3/08* (2013.01); *C08B 30/00* (2013.01); *C08B 37/00* (2013.01); *C08B 37/003* (2013.01); *C08B 37/0057* (2013.01); *C08J 3/096* (2013.01); *C08J 7/047* (2013.01); *C08K 5/19* (2013.01); *C08L 1/02* (2013.01); *C08L 3/02* (2013.01); *C08L 5/08* (2013.01); *C08L 5/14* (2013.01); *C09K 3/00* (2013.01); *D01F 2/02* (2013.01); *C08J 2301/02* (2013.01)

(58) Field of Classification Search
CPC ....................................... C08J 3/096
See application file for complete search history.

(56) References Cited

U.S. PATENT DOCUMENTS

| | | | |
|---|---|---|---|
| 3,447,939 | A | 6/1969 | Johnson et al. |
| 4,597,798 | A | 7/1986 | Kamata et al. |
| 4,622,372 | A | 11/1986 | Dicker et al. |
| 6,824,599 | B2 | 11/2004 | Swatloski et al. |
| 7,754,002 | B2 | 7/2010 | Maase et al. |
| 2008/0164440 | A1 | 7/2008 | Maase et al. |

FOREIGN PATENT DOCUMENTS

| | | |
|---|---|---|
| CN | 101654522 A | 2/2010 |
| EP | 0 684 525 A1 | 11/1995 |
| JP | 60-144332 A | 7/1985 |
| JP | 1-193337 A | 8/1989 |
| JP | 08-158148 A | 6/1996 |

(Continued)

OTHER PUBLICATIONS

Derwent abstract of JP 2006-137677, Jun. 1, 2006.*
Heinze et al., Macromol. Chem. Phys., 2000, 201, p. 627-631.*
Pinkert et al., Chem. Rev., 2009, 109, p. 6712-6728.*
Ass et al., Macromol. Biosci., 2004, 4, p. 1008-1013.*
Extended European Search Report dated Aug. 1, 2014, issued by the European Patent Office in counterpart Application No. 12760823.0.
Ramos L A et al., "Carboxymethylation of cellulose in the new solvent dimethyl sulfoxide/tetrabutylammonium fluoride", Carbohydrate Polymers, Applied Science Publishers, Ltd. Barking, GB, vol. 60, No. 2, May 6, 2005, pp. 259-267, XP027721518, ISSN: 0144-8617.

(Continued)

*Primary Examiner* — Jonathan S Lau
(74) *Attorney, Agent, or Firm* — Sughrue Mion, PLLC

(57) ABSTRACT

There is provided a solvent that can uniformly dissolve a polysaccharide within a short time period regardless of the crystal form of the polysaccharide and without requiring any special pretreatment. The solvent includes a tetraalkylammonium acetate represented by the below-indicated formula; and an aprotic polar solvent. A content of the aprotic polar solvent is 35 wt % or more.

[Chem. 1]

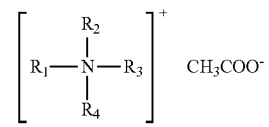

In the formula, $R_1$, $R_2$, $R_3$, and $R_4$ each independently represent an alkyl group having 3 to 6 carbon atoms.

8 Claims, 6 Drawing Sheets

(56) References Cited

FOREIGN PATENT DOCUMENTS

| | | |
|---|---|---|
| JP | 2006-137677 A | 6/2006 |
| JP | 2008-535992 A | 9/2008 |
| WO | 2004/101490 A2 | 11/2004 |
| WO | 2006/033836 A2 | 3/2006 |
| WO | 2008/067942 A1 | 6/2008 |
| WO | 2010/051176 A1 | 5/2010 |

OTHER PUBLICATIONS

C.L. McCormick and D. K. Lichatowich; Homogeneous Solution Reactions of Cellulose, Chitin, and Other Polysaccharides to Produce Controlled-Activity Pesticide Systems; Journal of Polymer Science: Polymer Letters Edition, vol. 17, 479-484(Aug. 1979).

Communication dated Feb. 15, 2015, issued by the State Intellectual Property Office of the People's Republic of China in counterpart Application No. 201280015269.6.

* cited by examiner

COMPARATIVE EXAMPLE 3

COMPARATIVE EXAMPLE 4

COMPARATIVE EXAMPLE 5

SOLVENT USED FOR DISSOLVING POLYSACCHARIDE AND METHOD FOR MANUFACTURING MOLDED ARTICLE AND POLYSACCHARIDE DERIVATIVE USING THIS SOLVENT

CROSS REFERENCE TO RELATED APPLICATIONS

This application is a National Stage of International Application No. PCT/JP2012/057321 filed Mar. 22, 2012, claiming priorities based on Japanese Patent Application Nos. 2011-063965, filed Mar. 23, 2011 and 2011-234659, filed Oct. 26, 2011, the contents of all of which are incorporated herein by reference in their entirety.

TECHNICAL FIELD

The present invention relates to a solvent to be used for dissolving a polysaccharide, and methods of producing a formed article and a polysaccharide derivative each involving using the solvent. More specifically, the present invention relates to a solvent that uniformly dissolves a polysaccharide within a short time period regardless of a crystal form of the polysaccharide and without requiring any special pretreatment.

BACKGROUND ART

A resource and environmental problem such as the depletion of a fossil resource or a global warming problem is one of the serious problems in the 21st century. The establishment of an alternative resource technology that is environmentally friendly and abundant, and can persist has been required for solving such problem. Biomasses such as polysaccharides are each an organic resource that is present in the largest amount on the earth and renewable. Of those, cellulose is the most abundant biomass because the cellulose is annually produced in an amount of about 400 billion tons on the earth. Main applications of the cellulose include a fiber, paper, and a film. However, the applications of the cellulose are remarkably limited because of the following reason. The cellulose is extremely poor in meltability and solubility, and hence involves a problem in terms of forming processability. Accordingly, an additionally simple method of dissolving the cellulose has been required.

An N-methylmorpholine-N-oxide/water mixed solvent method (for example, Patent Literature 1), and a method for dissolution with a mixture of lithium chloride and N,N-dimethylacetamide (for example, Non Patent Literature 1) have each been known as a method of directly dissolving the cellulose without relying on any chemical change. The mixed solvent of N-methylmorpholine-N-oxide and water is the only solvent capable of directly dissolving the cellulose that has been used in the industry. The solvent needs to be heated to around 130° C. for dissolving the cellulose. The operation involves danger because the solvent may detonate at about 150° C. In addition, the dissolved cellulose is rapidly decomposed in such high-temperature region and hence an additive for preventing the decomposition is indispensable.

The mixture of lithium chloride and N,N'-dimethylacetamide requires, for example, the following pretreatment depending on the kind of the cellulose to be dissolved. A cellulose suspension in which the cellulose has been dispersed is heated at 100° C. or more for a long time period, or the cellulose is swollen by being immersed in water or an alcohol for a long time period in advance. Accordingly, it is difficult to dissolve the cellulose simply. In addition, the molecular chain of the cellulose may be cleaved in the heating step which leads to reduce its strength as compared with that of the cellulose before the dissolution. The mixture of lithium chloride and N,N'-dimethylacetamide has been limited to a use on a laboratory scale owing to those problems, and hence has not been put into industrial use yet.

A method of dissolving the cellulose involving using a high-concentration aqueous solution of sodium thiocyanate has been known as another method (for example, Patent Literature 2). The solvent system can dissolve a cellulose called as type II which has been treated with an aqueous solution of sodium hydroxide or an amorphous cellulose not in a crystalline state, however, the solvent system cannot be applied to a natural-type cellulose. In addition, a heating step at 100° C. or more is needed in the method as well and hence the strength of the resultant cellulose may reduce.

A method of dissolving the cellulose using an imidazolium-based ionic liquid has been proposed in recent years. The method has been attracting attention because of its high cellulose-dissolving power and small environmental load (for example, Patent Literature 3). However, a cellulose solution using the ionic liquid has a high viscosity and is liable to gel, and hence the resultant cellulose solution involves a problem in terms of forming processability. In addition, a method, which includes adding an amino base to an ionic liquid so that the liquid expresses cellulose solubility or the cellulose solubility of the liquid is improved, has been known (for example, Patent Literature 4). However, the solubility of the cellulose is limited in the method as well and hence needs to be additionally improved. In addition, the addition of the amino base may decompose the cellulose. A method, which includes adding an amine to a mixed liquid of a tetraalkylammonium salt and dimethyl sulfoxide (DMSO) to dissolve the cellulose, has been known (for example, Patent Literature 5). However, there is room for improvement on the solubility of the cellulose in the method as well. In addition, the cellulose may be decomposed by the amine in the method as well.

CITATION LIST

Patent Literature

[PTL 1] U.S. Pat. No. 3,447,939 B
[PTL 2] JP 08-158148 A
[PTL 3] U.S. Pat. No. 6,824,599 B
[PTL 4] JP 2008-535992 A
[PTL 5] JP 01-193337 A

Non Patent Literature

[NPL 1] C. L. McCormick and D. K. Lichatowich, J. Polym. Sci.: Polym. Lett. Ed., 17, 479-484 (1979)

SUMMARY OF INVENTION

Technical Problem

The present invention aims to solve the conventional problems, and an object of the present invention is to provide a solvent that can uniformly dissolve a polysaccharide within a short time period regardless of the crystal form of the polysaccharide and without requiring any special pretreatment, and methods of producing a formed article and a polysaccharide derivative each involving using the solvent.

Solution to Problem

A solvent according to an embodiment of the present invention is used for dissolving a polysaccharide. The solvent includes a tetraalkylammonium acetate represented by the below-indicated formula; and an aprotic polar solvent. A content of the aprotic polar solvent is 35 wt % or more.

[Chem. 1]

In the formula, $R_1$, $R_2$, $R_3$, and $R_4$ each independently represent an alkyl group having 3 to 6 carbon atoms.

In one embodiment of the present invention, the tetraalkylammonium acetate includes tetrabutylammonium acetate.

In one embodiment of the present invention, the aprotic polar solvent has a donor number of 20 to 50.

In one embodiment of the present invention, the aprotic polar solvent includes at least one selected from an amide-based solvent, a sulfoxide-based solvent, and a pyridine-based solvent.

In one embodiment of the present invention, the aprotic polar solvent includes at least one selected from the group consisting of N,N-dimethylformamide, N,N-diethylformamide, N,N-dimethylacetamide, N,N-diethylacetamide, dimethyl sulfoxide, N-methyl-2-pyrrolidone, N,N'-dimethylpropyleneurea, 1,3-dimethyl-2-imidazolidinone, tetramethylurea, tetraethylurea, pyridine, and 4-methylpyridine, and derivatives thereof.

In one embodiment of the present invention, the polysaccharide includes cellulose, hemicellulose, starch, and chitin.

According to another aspect of the present invention, there is provided a method of producing a formed article. The method includes the steps of: preparing a solution containing the solvent as described above and a polysaccharide; and forming a formed article by using the solution.

According to still another aspect of the present invention, there is provided a method of producing a polysaccharide derivative. The method includes the steps of: preparing a solution containing the solvent according to any one of claims 1 to 6 and a polysaccharide; and conducting derivatization of a polysaccharide by using the solution.

Advantageous Effects of Invention

According to the present invention, there is provided a solvent that can uniformly dissolve a polysaccharide within a short time period regardless of the crystal form of the polysaccharide and without requiring any special pretreatment. In addition, the solvent of the present invention has a small environmental load because the solvent does not use an ammonium salt containing a halogen as an anion. Further, a solution prepared by dissolving the polysaccharide with the solvent of the present invention has fluidity even at room temperature and hence has excellent forming processability. In addition, the solvent of the present invention can be used as a reaction solvent for the polysaccharide as well, and hence the use of the solution prepared by dissolving the polysaccharide with the solvent of the present invention can easily provide a polysaccharide derivative.

DESCRIPTION OF EMBODIMENTS

<A. Solvent Used for Dissolving Polysaccharide>

Figure 1:
FIG. 1 is a photograph of cellulose solutions obtained in examples of the present invention.

A solvent of the present invention is a solvent used for dissolving a polysaccharide. The use of the solvent of the present invention can uniformly dissolve the polysaccharide within a short time period regardless of the crystal form of the polysaccharide and without any pretreatment step for the polysaccharide. The solvent contains a tetraalkylammonium acetate represented by the below-indicated formula and an aprotic polar solvent. The solvent of the present invention is free of any halogen as an anion. Therefore, an environmental load can be reduced.

[Chem. 2]

In the formula, $R_1$, $R_2$, $R_3$, and $R_4$ each independently represent an alkyl group having 3 to 6 carbon atoms. When any one of $R_1$, $R_2$, $R_3$, and $R_4$ represents an alkyl group having 2 or less carbon atoms or an alkyl group having 7 or more carbon atoms, the solvent may show reduced solubility for the polysaccharide or may be unable to dissolve the polysaccharide. $R_1$, $R_2$, $R_3$, and $R_4$ may be identical to or different from one another. The tetraalkylammonium acetate is preferably tetrabutylammonium acetate, tetrapropylammonium acetate, tetrapentylammonium acetate, tetrahexylammonium acetate, more preferably tetrabutylammonium acetate. The tetraalkylammonium acetates may be used alone or in combination.

The content of the tetraalkylammonium acetate in the solvent of the present invention is preferably 0.1 wt % to 65 wt %, more preferably 1 wt % to 55 wt %, still more preferably 3 wt % to 45 wt %, particularly preferably 5 wt % to 35 wt %. When the content of the tetraalkylammonium acetate is less than 0.1 wt %, it may be unable to dissolve a polysaccharide sufficiently. When the content of the tetraalkylammonium acetate exceeds 65 wt %, the solubility and dissolution rate of the polysaccharide may reduce. The solvent of the present invention can be suitably used in, for example, an application for producing a formed article because the solvent has high solubility for the polysaccharide and can suppress a detrimental effect such as the decomposition of the dissolved polysaccharide.

In the present invention, the aprotic polar solvent is used. The use of the tetraalkylammonium acetate and the aprotic polar solvent provides a solvent that can uniformly dissolve a polysaccharide within a short time period regardless of the crystal form of the polysaccharide and without any pretreatment for the polysaccharide. When a erotic solvent is used instead of the aprotic polar solvent, the protic solvent donates a proton to preferentially form a hydrogen bond with a carboxylic acid group as the anion of the tetraalkylammonium acetate. As a result, the solubility of the polysaccharide may be lost or the solubility of the polysaccharide may remarkably reduce.

Any appropriate solvent can be used as the aprotic polar solvent, and at least one kind selected from an amide-based solvent, a sulfoxide-based solvent, and a pyridine-based solvent is preferred. Specific examples thereof include N,N-dimethylformamide, N,N-diethylformamide, N,N-dimethylacetamide, N,N-diethylacetamide, dimethylsulfoxide, N-methyl-2-pyrrolidone, N,N'-dimethylpropyleneurea, 1,3-dimethyl-2-imidazolidinone (N,N'-dimethylethyleneurea), tetramethylurea, tetraethylurea, N,N,N',N'-tetramethylurea, pyridine, 4-methylpyridine, 2,6-dimethylpyridine, and 2,4,6-trimethylpyridine, and derivatives thereof. Of those, preferred is at least one kind selected from the group consisting of N,N-dimethylformamide, N,N-diethylformamide, N,N-dimethylacetamide, N,N-diethylacetamide, dimethylsulfoxide, N-methyl-2-pyrrolidone, N,N'-dimethylpropyleneurea, 1,3-dimethyl-2-imidazolidinone, tetramethylurea, tetraethylurea, pyridine, and 4-methylpyridine, and derivatives thereof.

The aprotic polar solvent has a donor number of preferably 20 to 50, more preferably 25 to 40, still more preferably 25 to 35. The aprotic polar solvent preferably has strong hydrogen bond acceptor property and a solubility parameter similar to that of the tetraalkylammonium acetate. That is, when the donor number exceeds 50, compatibility between the aprotic polar solvent and the tetraalkylammonium acetate may reduce. In addition, when the donor number is less than 20, the hydrogen bond acceptor property of the aprotic polar solvent may reduce to cause a reduction in solubility of the polysaccharide. It should be noted that the donor number is one measure of electron pair-donating property upon action of a solvent molecule as a Lewis base, and refers to an absolute value when enthalpy upon reaction between 3 mol/L to 10 mol/L of $SbCl_5$ and the solvent molecule in 1,2-dichloroethane is represented in a kcal/mol unit.

For example, the donor numbers of the aprotic polar solvents mentioned as examples in the foregoing are as follows: N,N-dimethylformamide, 26.6; N,N-diethylformamide, 30.9; N,N-dimethylacetamide, 27.8; N,N-diethylacetamide, 32.2; dimethyl sulfoxide, 29.8; N-methyl-2-pyrrolidone, 27.3; N,N'-dimethylpropyleneurea, 29.3; 1,3-dimethyl-2-imidazolidinone (N,N'-dimethylethyleneurea), 27.8; tetramethylurea, 31.0; tetraethylurea, 28.0; N,N,N',N'-tetramethylurea, 29.6; pyridine, 33.1; 4-methylpyridine, 31.5; 2,6-dimethylpyridine, 33.0; and 2,4,6-trimethylpyridine, 32.7. In the description, the donor number of each aprotic polar solvent is a value measured by a Gutmann method.

The aprotic polar solvents may be used alone or in combination. In addition, an aprotic polar solvent having a donor number in the range of 20 to 50 and an aprotic polar solvent having a donor number deviating from the range may be used in combination.

In the solvent of the present invention, the content of the aprotic polar solvent is 35 wt % or more. Setting the content of the aprotic polar solvent to 35 wt % or more provides a solvent that can uniformly dissolve a polysaccharide within a short time period regardless of the crystal form of the polysaccharide and without any pretreatment for the polysaccharide. The content of the aprotic polar solvent is preferably 35 wt % to 99.9 wt %, more preferably 45 wt % to 99 wt %, still more preferably 55 wt % to 97 wt %. As described above, in the present invention, the content of the tetraalkylammonium acetate can be reduced. Accordingly, the content of the aprotic polar solvent is larger than that of a conventional solvent used for dissolving a polysaccharide. Therefore, a solution in which the polysaccharide has been dissolved has high flowability and hence can be suitably used in the processing of a formed article.

As described above, the solvent of the present invention has the following effects: the solubility and dissolution rate of the polysaccharide are improved, and an increase in viscosity of the solution after the dissolution of the polysaccharide is suppressed. Those effects can be adjusted by appropriately combining the kinds of the aprotic polar solvent and the tetraalkylammonium acetate.

The mechanism via which the polysaccharide dissolves in the solvent of the present invention is assumed to be similar to a mechanism in a lithium chloride/N,N-dimethylacetamide mixed solvent. Hereinafter, the dissolution mechanism is described by taking the case where cellulose is used as the polysaccharide and N,N-dimethylacetamide (DMAc) is used as the aprotic polar solvent as an example. (1) In the solvent, the tetraalkylammonium acetate is divided into an anion ($CH_3COO^-$) and a cation (tetraalkylammonium ($TAA$)$^+$) by a DMAc molecule. (2) The $TAA^+$ interacts with oxygen of DMAc to form a macrocation ($[DMAc+TAA]^+$). (3) $CH_3COO$ breaks a hydrogen bond between the hydroxyl groups of the cellulose to form a hydrogen bond with oxygen of the cellulose on its own. (4) The macrocation forms a weak interaction with oxygen of the cellulose. In other words, the solvent of the present invention and the cellulose are assumed to adopt the below-indicated form in the solvent. It is assumed that the solvent of the present invention can uniformly dissolve the polysaccharide within a short time period regardless of the crystal form of the polysaccharide and without any pretreatment for the polysaccharide because the solvent of the present invention and the polysaccharide adopt the below-indicated form without any pretreatment step for the polysaccharide.

[Chem. 3]

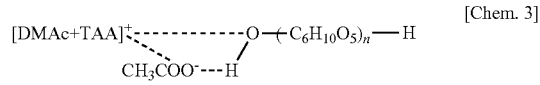

The solvent of the present invention can be suitably used as a reaction solvent for the polysaccharide as well. The solvent of the present invention can be used as a reaction solvent for any appropriate reaction of the polysaccharide, and examples of the reaction include derivatization reactions such as an esterification reaction, an etherification reaction, and a halogenation reaction, and a hydrolysis reaction (saccharification reaction), solvolysis, an oxidation reaction, a grafting reaction, a cross-linking reaction, a urethanation reaction, and a substitution reaction for carbon in the polysaccharide. The derivatization of the polysaccharide can impart performance such as water resistance, heat resistance, UV resistance, solvent solubility, thermoplasticity, or processability to the polysaccharide. In addition, the hydrolysis of the polysaccharide can provide glucose or an oligosaccharide. The solvent of the present invention can uniformly dissolve the polysaccharide within a short time period regardless of the crystal form of the polysaccharide and without any pretreatment for the polysaccharide, and is excellent in solubility for the polysaccharide. Therefore, an additionally large amount of the polysaccharide can be subjected to a reaction in one reaction process. In addition, the solvent of the present invention is a uniform reaction system, and hence the polysaccharide can be subjected to a reaction under a mild condition and within a short time period. In addition, the solvent enables the control of the modification ratio of the polysaccharide or the selective modification reaction of a hydroxyl group. Because of the foregoing reasons, the solvent can be suitably used as a reaction solvent for the polysaccharide.

The polysaccharide that can be dissolved with the solvent of the present invention is not limited, and may be a natural polysaccharide or may be a regenerated polysaccharide. Specific examples thereof include cellulose, hemicellulose, starch, and chitin. In addition, the polysaccharide may be a polysaccharide containing any other polymer such as lignin, tannin, or a protein. The shape of such polysaccharide is not limited, and may be a fibrous shape, may be a particulate shape, or may be a flocculent shape. In addition, the polysaccharide may be in a crystalline state or may not be in a crystalline state (e.g., an amorphous cellulose). In addition, the solvent of the present invention can be used for dissolving a material containing the polysaccharide as well. The material containing the polysaccharide may be a material constituted only of the polysaccharide, or may be a material constituted of the polysaccharide and any other component. A desired polysaccharide can be taken out by dissolving the material constituted of the polysaccharide and the other component in the solvent of the present invention. The material is not particularly limited, and examples thereof include paper, a fiber, a fabric, and a film. According to the solvent of the present invention, a polysaccharide can be uniformly dissolved within a short time period with no limitations by the kind and the like of the polysaccharide. When the solvent of the present invention is used, the viscosity of the resultant solution in which the polysaccharide has been dissolved is suppressed, and the solution has good flowability and has excellent forming processability.

When the polysaccharide is dissolved with the solvent of the present invention, the content of the polysaccharide can be appropriately set depending on the polymerization degree, and degree of crystallinity, of the polysaccharide to be used. The content of the polysaccharide is preferably 0.1 wt % to 50 wt %. As long as the content of the polysaccharide falls within the range, the solvent of the present invention maintains its excellent solubility. In addition, the viscosity of a solution after the dissolution of the polysaccharide is suppressed, and hence a solution having good flowability and excellent forming processability is obtained.

<B. Method of Producing Formed Article>

A method of producing a formed article of the present invention includes the steps of: preparing a solution containing the solvent and a polysaccharide (hereinafter sometimes referred to as "polysaccharide-containing solution"); and forming a formed article by using the polysaccharide-containing solution.

<B-1. Step of Preparing Polysaccharide-Containing Solution>

The step of preparing the solution containing the solvent of the present invention and the polysaccharide can be performed by any appropriate means. For example, the solution can be prepared by: adding the polysaccharide and, as required, any appropriate additive to the solvent of the present invention; and dissolving the polysaccharide and the like with any appropriate stirring means while heating the mixture as required.

The additive can be appropriately selected depending on purposes, and examples thereof include an antioxidant, a plasticizer, a filler, a UV absorbing agent, a pigment, an antistatic, and other polymer materials. The compounding amount of the additive has only to be appropriately set depending on kinds and intended purposes of the additive.

The content of the polysaccharide in the polysaccharide-containing solution is not particularly limited, and has only to be appropriately set depending on the polymerization degree of the polysaccharide and/or the kind of the formed article. The content of the polysaccharide is preferably 0.1 wt % to 50 wt %. Setting the content of the polysaccharide within the range can suppress the viscosity of the polysaccharide-containing solution. Accordingly, the solution has good flowability and hence can exert excellent forming processability.

The temperature at which the polysaccharide is dissolved has only to be set to any appropriate value, and is set within, for example, the range of 0° C. to 100° C., preferably the range of 0° C. to 95° C., more preferably the range of 10° C. to 80° C., still more preferably the range of 20° C. to 70° C. When the temperature at which the polysaccharide is dissolved is excessively low (for example, when the temperature is less than 0° C.), the dissolution rate of the polysaccharide may reduce and the viscosity of the polysaccharide-containing solution to be obtained may increase. In addition, when the temperature at which the polysaccharide is dissolved is excessively high (for example, when the temperature exceeds 120° C.), the decomposition of the tetraalkylammonium acetate, the aprotic polar solvent, or the polysaccharide may occur. A conventional solvent used for dissolving a polysaccharide needs to be heated to a high temperature before the dissolution of the polysaccharide, and hence involves problems in terms of operational safety and the quality of the polysaccharide to be obtained after the dissolution. According to the solvent of the present invention, even at, for example, a temperature as low as 60° C. or less at which it is difficult to dissolve a polysaccharide with the conventional solvent, the polysaccharide can be uniformly dissolved within a short time period regardless of the crystal form of the polysaccharide and without any pretreatment for the polysaccharide.

Any appropriate method can be employed as a heating method upon setting to the dissolution temperature, and examples thereof include a heating method to be typically employed upon dissolution of a polysaccharide (e.g., a heating stirrer) and a microwave heating method.

The dissolution of the polysaccharide can be performed with any appropriate means. For example, when a polysaccharide-containing solution having a large solvent content and high flowability is prepared, mechanical stirring and ultrasonic vibration can be suitably employed. In addition, when a polysaccharide-containing solution having a large polysaccharide content and some degree of viscosity is prepared, a biaxial extrusion kneader and a kneader can be suitably used. According to any such means, the dissolution rate of the polysaccharide can be accelerated and the uniformity of the resultant polysaccharide-containing solution can be additionally improved.

In addition, the dissolution of the polysaccharide may be performed in an inert gas. The dissolution of the polysaccharide in the inert gas can prevent a reduction in polymerization degree of the polysaccharide.

<B-2. Step of Forming Formed Article>

The polysaccharide-containing solution has a suppressed viscosity, has good flowability, and has excellent forming processability. Therefore, a desired formed article can be produced in an additionally efficient manner. The formed article is not limited, and examples thereof include a fiber, a film, a particle, a porous body, and a capsule.

The step of forming the formed article is not limited and can be appropriately selected depending on the desired formed article. For example, when a fiber using the polysaccharide is formed, the formed article can be formed by a dry spinning method, a wet spinning method, or the like. Specifically, when the fiber is formed by employing the wet spinning method, the fiber can be obtained by: ejecting the polysaccharide-containing solution into a coagulating bath containing a solvent capable of extracting the tetraalkylammonium acetate and the aprotic polar solvent (hereinafter sometimes referred to as "coagulant"); removing the aprotic polar solvent and the like to solidify the polysaccharide; stretching the solidified polysaccharide; and drying the stretched product.

In addition, any appropriate method can be employed as a method of forming a film using the polysaccharide, and for example, a solvent casting method can be employed. Specifically, the film can be obtained by: casting the polysaccharide-containing solution on any appropriate support; immersing the support on which the polysaccharide-containing solution has been cast in the coagulating bath containing the coagulant; removing the tetraalkylammonium acetate, the aprotic polar solvent, and the like to solidify the polysaccharide; and drying the solidified product.

The coagulant has only to be a solvent capable of extracting the tetraalkylammonium acetate and the aprotic polar solvent, and may be an inorganic solvent or may be an organic solvent. Specific examples thereof include: water; ketones such as acetone and methyl ethyl ketone; alcohols such as methanol, ethanol, and propanol; sulfoxide-based solvents such as dimethyl sulfoxide; and amide-based solvents such as dimethylacetamide and dimethylformamide. Of those, water, acetone, methanol, or ethanol is suitably used in terms of low cost, low boiling point, and good coagulating property.

The temperature of the coagulating bath has only to be the temperature at which the aprotic polar solvent and the like in the polysaccharide-containing solution can be removed, and the temperature can be set to, for example, 0° C. to 100° C. or a temperature equal to or less than the boiling point of the coagulant.

A temperature for the drying has only to be the temperature at which the solvent used in the step of forming the formed article, and the aprotic polar solvent and the like in the polysaccharide-containing solution can be removed, and the temperature is, for example, 40° C. to 120° C. Any appropriate means can be used as drying means, and examples thereof include a heating roll and drying with hot air.

<C. Method of Producing Polysaccharide Derivative>

A method of producing a polysaccharide derivative of the present invention includes the steps of: preparing a solution containing the solvent and a polysaccharide (hereinafter sometimes referred to as "polysaccharide-containing solution"); and conducting derivatization of the polysaccharide by using the polysaccharide-containing solution.

<C-1. Step of Preparing Polysaccharide-Containing Solution>

The step of preparing the solution containing the solvent of the present invention and the polysaccharide can be performed by any appropriate means. Specifically, the polysaccharide-containing solution can be prepared by the same step as that in the section B-1.

<C-2. Step of Conducting Derivatization of Polysaccharide>

The solvent of the present invention can be suitably used as a reaction solvent for the polysaccharide as well. Accordingly, the use of the polysaccharide-containing solution can derivatize the polysaccharide in an additionally easy manner. Further, the use of the polysaccharide-containing solution can facilitate the performance of: the control of the modification ratio of the polysaccharide; or the selective modification reaction of a hydroxyl group.

The step of conducting derivatization of the polysaccharide can be performed by any appropriate method. For example, a desired polysaccharide derivative is obtained by: adding a compound having a desired functional group to the polysaccharide-containing solution; and stirring the solution while heating the solution at a temperature in the range of 30° C. to 90° C. as required.

A reaction for conducting derivatization of the polysaccharide is preferably an esterification reaction and/or an etherification reaction, and is more preferably the esterification reaction. When the esterification reaction and the etherification reaction are performed, these reactions may be performed alone sequentially or may be simultaneously performed.

<C-2-1. Esterification Reaction>

The esterification reaction includes a reaction involving modifying part or all of the hydroxyl groups of the polysaccharide with ester bonds to transform the polysaccharide into an ester thereof. The ester can be appropriately selected, and examples thereof include an acetate, an acetate propionate, an acetate butyrate, and a phthalate. Only one kind of the esters may be incorporated, and a mixed ester containing two or more kinds of the esters is also permitted.

Any appropriate esterifying agent can be used as an esterifying agent, and an acid chloride or an acid anhydride is preferred. Any appropriate acid chloride can be used as the acid chloride, and examples thereof include propionyl chloride, butyryl chloride, octanoyl chloride, stearoyl chloride, benzoyl chloride, and p-toluenesulfonic acid chloride. In addition, in a reaction of the acid chloride, an alkaline compound may be added for the purposes of not only a catalytic function but also the neutralization of an acidic substance as a byproduct. Any appropriate alkaline substance can be used as the alkaline substance, and examples thereof include: tertiary amine compounds such as triethylamine and trimethylamine; organic alkaline substances such as pyridine and dimethylaminopyridine; and inorganic alkaline substances such as sodium hydroxide, potassium hydroxide, sodium carbonate, and potassium carbonate.

Any appropriate acid anhydride can be used as the acid anhydride, and examples thereof include: aliphatic acid anhydrides such as acetic anhydride, propionic anhydride, and butyric anhydride; and dibasic acid anhydrides such as maleic anhydride, succinic anhydride, and phthalic anhydride. In addition, in a reaction of the acid anhydride, an acidic catalyst such as sulfuric acid, hydrochloric acid, or phosphoric acid or an alkaline compound such as triethylamine or pyridine may be added as a catalyst.

<C-2-2. Etherification Reaction>

The etherification reaction includes a reaction involving subjecting part or all of the hydroxyl groups of the polysaccharide to ether bonding. The number of kinds of the ethers may be only one, or two or more kinds thereof may be incorporated.

Any appropriate etherifying agent can be used as an etherifying agent, and examples thereof include chlorides or bromides each having 1 to 10 carbon atoms, specifically, methyl chloride, methyl bromide, ethyl chloride, ethyl bromide, propyl chloride, and propyl bromide. In addition, in the etherification reaction, a catalyst may be further added. Any appropriate catalyst can be used as the catalyst. For example, the catalyst to be used for the esterification reaction can be used, and the catalyst is, for example, an organic alkaline substance or an inorganic alkaline substance. Specific examples thereof include: tertiary amine compounds such as triethylamine and trimethylamine; organic alkaline substances such as pyridine and dimethylaminopyridine; and inorganic alkaline substances such as sodium hydroxide, potassium hydroxide, sodium carbonate, and potassium carbonate.

EXAMPLES

The present invention is described in more detail by way of the following examples. It should be noted that the present invention is not limited to the examples.

Example 1

One gram of N,N-dimethylacetamide (special grade, donor number: 27.8) and 0.4 g of tetrabutylammonium acetate (manufactured by Tokyo Chemical Industry Co., Ltd.) were added to a 10-ml vial bottle, and then tetrabutylammonium acetate was dissolved while the mixture was stirred with a magnetic stirrer at 60° C. (tetraalkylammonium acetate: N,N-dimethylacetamide=28:72 (weight ratio)). While the solution was heated to 60° C. and stirred with a heating stirrer, 0.14 g of a microcrystalline cellulose (manufactured by Merck, trade name: Cellulose microcrystalline) was dissolved. The resultant cellulose solution was observed with a polarization microscope and the time point at which a substance showing birefringence was no longer observed was defined as the time point at which the cellulose completely dissolved, followed by the measurement of the dissolution time of the cellulose. Table shows the result. FIG. 1 shows a photograph obtained by photographing the external appearance of the resultant cellulose solution.

Examples 2 to 14

The dissolution times of the cellulose were measured in the same manner as in Example 1 except that aprotic polar solvents shown in Table 1 were used instead of N,N-dimethylacetamide. When a substance showing birefringence was observed even after 5 hours of continuous stirring, the stirring was stopped at the time point and then the state of the cellulose solution was visually observed.

For an aprotic polar solvent in which a substance showing birefringence was observed even after 5 hours of continuous stirring, the dissolution time of the cellulose was measured again in the same manner as in Example 1 except that the amount of the microcrystalline cellulose was changed to 0.07 g. Table 1 shows the results of the respective examples. FIG. 1 shows a photograph obtained by photographing the external appearances of the cellulose solutions of Examples 2 to 5.

Comparative Example 1

The dissolution time of the cellulose was measured in the same manner as in Example 1 except that methanol (special grade, donor number: 19) was used instead of N,N-dimethylacetamide. Table 2 shows the result. In the solution, a substance showing birefringence was observed even after 5 hours of continuous stirring.

Figure 2:
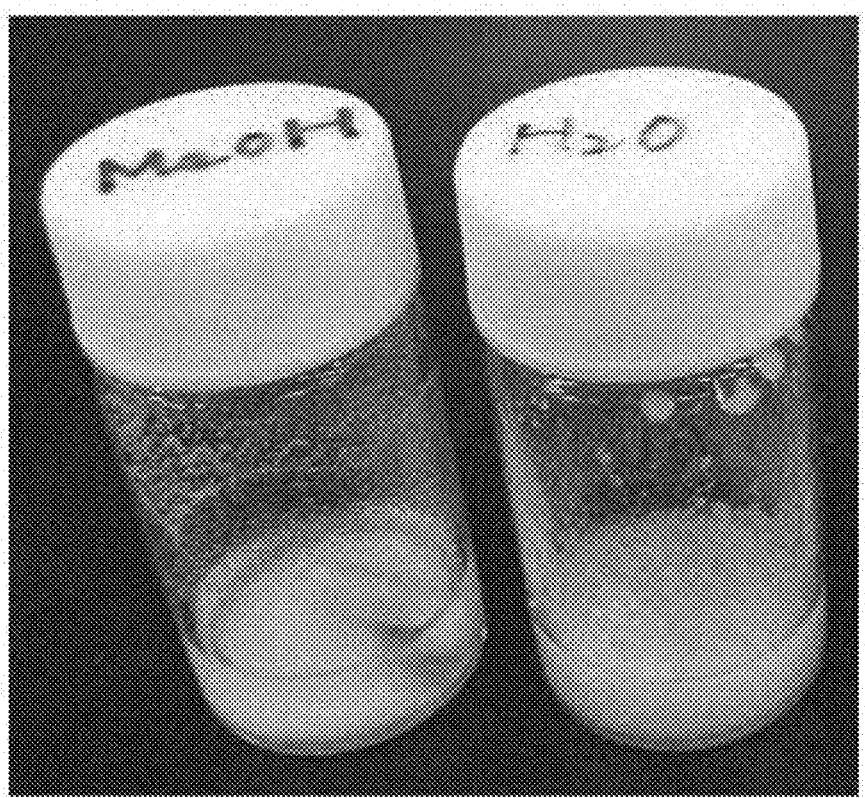
FIG. 2 is a photograph of cellulose solutions obtained in comparative examples.

Again, the solution was stirred for 3 hours with a heating stirrer while being heated to 60° C. in the same manner as in Example 1 except that methanol was used instead of N,N-dimethylacetamide. Next, the solution was left to stand at room temperature and then the state of the solution was visually observed. FIG. 2 shows a photograph of the external appearance of the resultant solution. The solution after the stirring was a white dispersion liquid. The dispersion liquid was left to stand at room temperature. As a result, after a lapse of a certain time period, the dispersion liquid was separated into an upper colorless and transparent layer, and a lower white polysaccharide-precipitated layer.

Comparative Example 2

The cellulose was dissolved in the same manner as in Comparative Example 1 except that water (donor number: 18) was used instead of methanol. Table 2 shows the result. In the solution, a substance showing birefringence was observed even after 5 hours of continuous stirring. Next, the cellulose was dissolved again in the same manner as in Comparative Example 1, and then a heated state and the state of the solution after standing at room temperature were visually observed. FIG. 2 shows a photograph of the external appearance of the resultant solution after the standing at room temperature. In each state, the solution after the stirring was an opaque dispersion liquid. No layer separation of the dispersion liquid occurred even after a lapse of time.

Comparative Example 3

Figure 3:
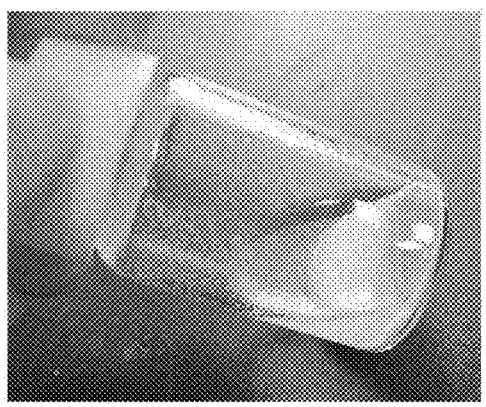
FIG. 3 are photographs of cellulose solutions obtained in other comparative examples.
Figure 3:
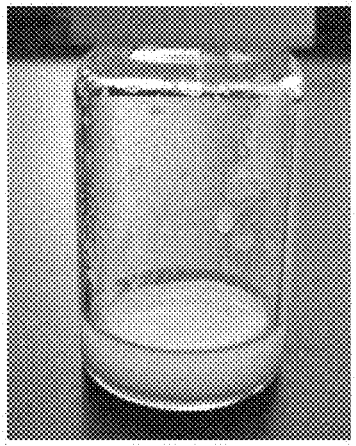
Figure 3:
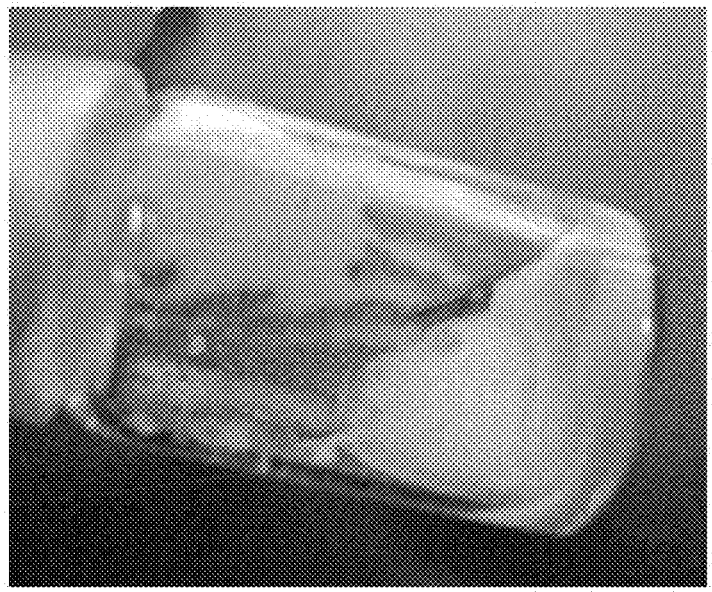

The cellulose was dissolved in the same manner as in Comparative Example 1 except that formamide (special grade, donor number: 24) was used instead of methanol. Table 2 shows the result. In the solution, a substance showing birefringence was observed even after 5 hours of continuous stirring. Next, the cellulose was dissolved again in the same manner as in Comparative Example 1, and then a heated state and the state of the solution after standing at room temperature were visually observed. FIG. 3 shows a photograph of the external appearance of the resultant solution after the standing at room temperature. In each state, the solution after the stirring was an opaque dispersion liquid.

Comparative Example 4

The cellulose was dissolved in the same manner as in Comparative Example 1 except that piperidine (special grade, donor number: 51) was used instead of methanol. Table 2 shows the result. In the solution, a substance showing birefringence was observed even after 5 hours of continuous stirring. Next, the cellulose was dissolved again in the same manner as in Comparative Example 1, and then a heated state and the state of the solution after standing at room temperature were visually observed. FIG. 3 shows a photograph of the external appearance of the resultant solution after the standing at room temperature. In each state, the solution after the stirring was an opaque dispersion liquid.

Comparative Example 5

The cellulose was dissolved in the same manner as in Example except that: N,N-dimethylacetamide was not used; 1.4 g of tetrabutylammonium acetate were used; and the solution was heated to 100° C. with a heating stirrer. In the resultant solution, a substance showing birefringence was observed even after 5 hours of continuous stirring. Next, the cellulose was dissolved again in the same manner as in Comparative Example 1, and then a heated state and the state of the solution after standing at room temperature were visually observed. FIG. 3 shows a photograph of the external appearance of the resultant solution after the standing at room temperature. In each state, the solution after the stirring was an opaque dispersion liquid.

TABLE 1

|  | Aprotic polar solvent | Donor number | Solubility of cellulose[1] | Dissolution time[2] (minute(s)) |
|---|---|---|---|---|
| Example 1 | N,N-Dimethylacetamide | 27.8 | ◎ | 10 |
| Example 2 | Dimethyl sulfoxide | 29.8 | ◎ | 0.5 |
| Example 3 | N,N-Dimethylformamide | 26.6 | ◎ | 10 |
| Example 4 | 1-Methyl-2-pyrrolidone | 27.3 | ◎ | 10 |
| Example 5 | Pyridine | 33.1 | ◎ | 600 |
| Example 6 | N,N'-Dimethyl propylene urea | 29.3 | ◎ | ≥300 |
| Example 7 | 1,3-Dimethyl-2-imidazolinone | 27.8 | ◎ | 60 |
| Example 8 | N,N,N,N-Tetramethylurea | 29.6 | ◎ | ≥300 |
| Example 9 | N,N,N,N-Tetraethylurea | — | ○ | — |
| Example 10 | N,N'-Dimethylformamide | 30.9 | ○ | — |
| Example 11 | N,N'-Diethylacetamide | 32.2 | ○ | — |
| Example 12 | 4-Methylpyridine | 31.5 | ○ | — |
| Example 13 | 2,6-Dimethylpyridine | 33 | ○ | — |
| Example 14 | 2,4,6-Trimethylpyridine | 32.7 | ○ | — |

[1] ◎: 9 Weight percent of the microcrystalline cellulose can be dissolved. ○: 5 Weight percent of the microcrystalline cellulose can be dissolved but the solution becomes slightly opaque when 9 wt % of the microcrystalline cellulose is dissolved. X: The microcrystalline cellulose cannot be dissolved.
[2] The dissolution time of 9 wt % of the cellulose

TABLE 2

|  | Solvent | Donor number | Solubility of cellulose[1] | Dissolution time[2] (minute(s)) |
|---|---|---|---|---|
| Comparative Example 1 | Methanol | 19 | X | — |
| Comparative Example 2 | Water | 18 | X | — |
| Comparative Example 3 | Formamide | 24 | X | — |
| Comparative Example 4 | Piperidine | 51 | X | — |

[1] ◎: 9 Weight percent of the microcrystalline cellulose can be dissolved. ○: 5 Weight percent of the microcrystalline cellulose can be dissolved but the solution becomes slightly opaque when 9 wt % of the microcrystalline cellulose is dissolved. X: The microcrystalline cellulose cannot be dissolved.
[2] The dissolution time of 9 wt % of the cellulose As shown in Table 1, each of the solvents in Examples 1 to 14 using a tetraalkylammonium acetate and an aprotic polar solvent was able to uniformly dissolve the polysaccharide in a crystalline state within a short time period without any pretreatment for the polysaccharide. On the other hand, the polysaccharide could not be dissolved in each of Comparative Examples 1 to 4 using a protic solvent and tetrabutylammonium acetate; and Comparative Example 5 using tetrabutylammonium acetate alone.

Example 15

The dissolution time of the cellulose was measured in the same manner as in Example 1 except that 0.24 g of the microcrystalline cellulose was used. The dissolution time of the cellulose was 50 minutes. The resultant solution was visually observed and found to be transparent. In addition, the solution had flowability at room temperature. The solvent of the present invention containing a tetraalkylammonium acetate and an aprotic polar solvent was able to dissolve 15 wt % of the microcrystalline cellulose.

Example 16

The cellulose was dissolved in the same manner as in Example 1 except that 0.8 g of the microcrystalline cellulose was used. The resultant solution was visually observed and found to be transparent. In addition, the solution had flowability at room temperature. The solvent of the present invention containing a tetraalkylammonium acetate and an aprotic polar solvent was able to dissolve 36 wt % of the microcrystalline cellulose.

Example 17

The dissolution time of the cellulose was measured in the same manner as in Example 1 except that 0.14 g of a commercially available linter pulp was used instead of the microcrystalline cellulose. The dissolution time of the cellulose was 450 minutes. The resultant solution was visually observed and found to be transparent. In addition, the solution had flowability at room temperature. The solvent of the present invention containing a tetraalkylammonium acetate and an aprotic polar solvent was able to successfully dissolve the linter pulp.

Example 18

Absorbent cotton was dissolved in the same manner as in Example 1 except that 0.3 g of a commercially available absorbent cotton was used instead of the microcrystalline cellulose. The dissolution time of the absorbent cotton was 360 minutes. The resultant solution was visually observed and found to be transparent. In addition, the solution had flowability at room temperature. The solvent of the present invention containing a tetraalkylammonium acetate and an aprotic polar solvent was able to successfully dissolve the absorbent cotton.

Example 19

Forming of Fiber

Figure 4:
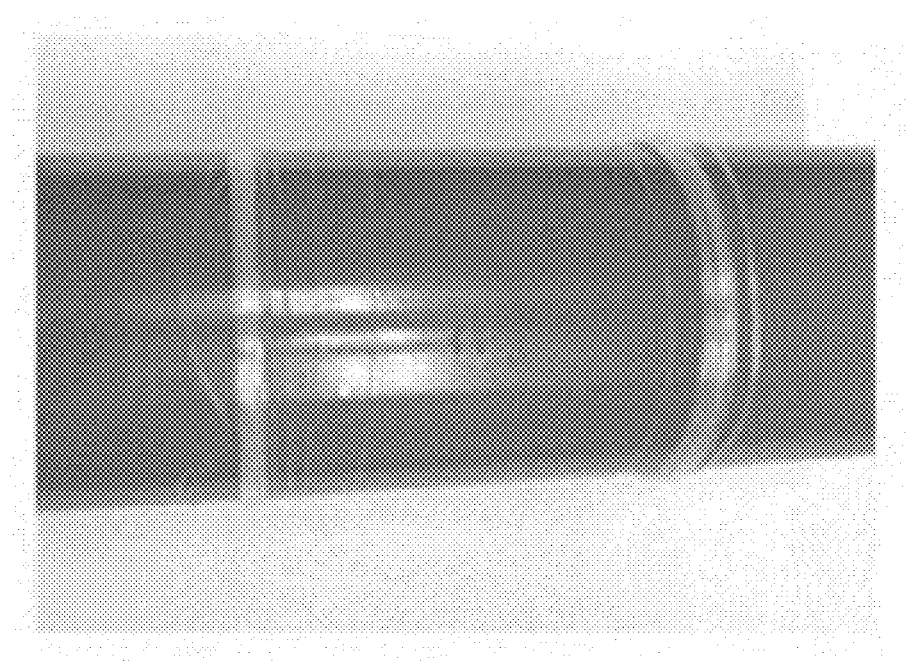
FIG. 4 is a photograph of a cellulose fiber obtained in another example of the present invention.

The cellulose solution obtained in Example 1 was cooled to room temperature. Next, the solution was charged into a syringe and then the syringe was fixed to a spinning machine having an extruding function. The solution was ejected from a nozzle having a pore diameter of 0.30 mmϕ into a methanol bath at normal temperature, and then tetrabutylammonium acetate and N,N-dimethylacetamide were removed. Next, the ejected fibrous cellulose was stretched at a ratio of 1.2, and then the stretched product was washed with water at 60° C., dried with a dry heating roll at 100° C., and wound up. FIG. 4 shows a photograph of the resultant cellulose fiber.

Example 20

Forming of Film

Figure 5:
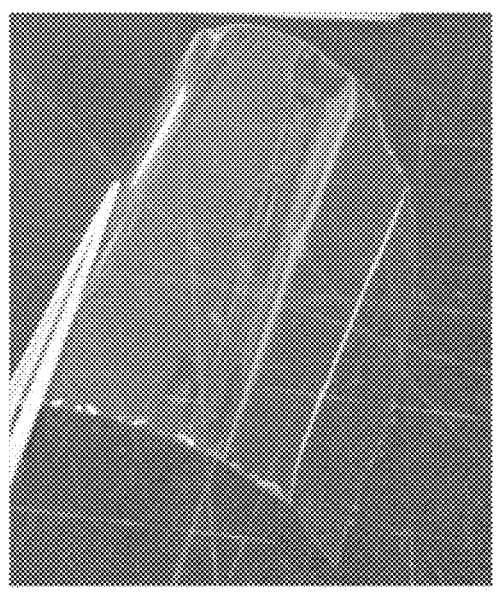
FIG. 5 is a photograph of a cellulose film obtained in Example 20.

The solution obtained in Example 1 was cooled to room temperature. Next, the solution was cast on a glass substrate and then the glass substrate was immersed in a methanol bath, so as to remove tetrabutylammonium acetate and N,N-dim ethylacetamide. Next, the glass substrate was dried at room temperature and then a film was peeled from the glass substrate. Thus, a cellulose film was obtained. FIG. 5 shows a photograph of the resultant cellulose film.

The resultant film was excellent in transparency. In addition, the resultant film had a tensile strength of 98 MPa, a modulus of elasticity of 4,627 MPa, and a distortion of 9.7%. In other words, the film had a sufficient strength.

Example 21

Derivatization 1 of Polysaccharide 1.1 Grams of acetic anhydride were added to the solution obtained in Example 1, and then the mixture was stirred for 40 minutes with a heating stirrer while being heated to 70° C. Thus, a reaction solution was obtained. The resultant reaction solution was dropped to distilled water while distilled water was stirred, and then the system was washed until tetrabutylammonium acetate, N,N-dimethylacetamide, acetic anhydride, and acetic acid were completely removed. Thus, a cellulose derivative 1 was obtained. It was confirmed by IR analysis that the resultant cellulose derivative 1 was completely washed.

Figure 6:
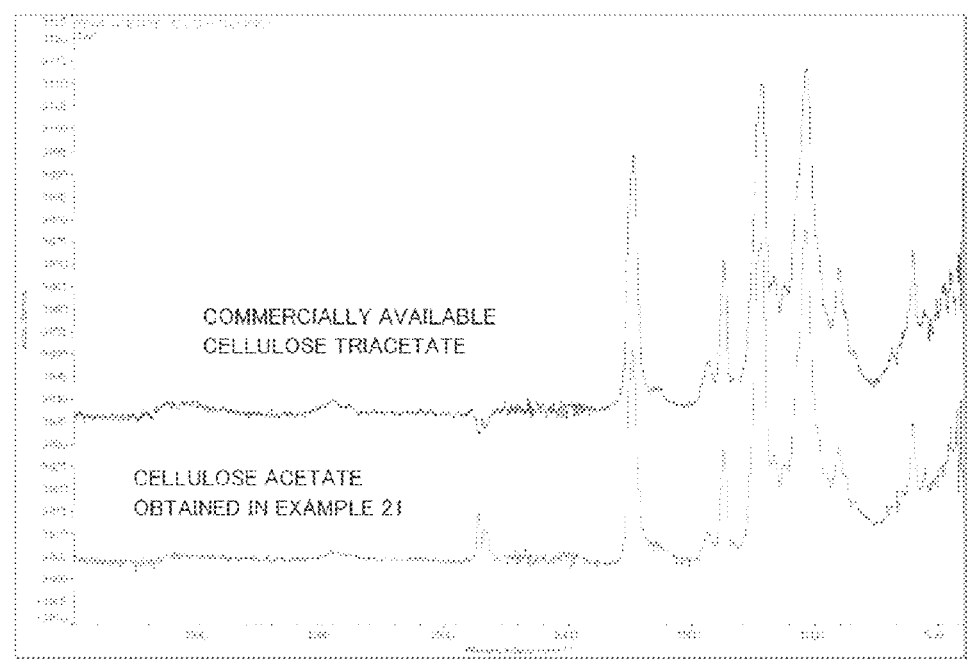
FIG. 6 shows the IR spectra of a cellulose acetate obtained in Example 21 and a commercially available cellulose acetate.

The resultant cellulose derivative 1 and a commercially available cellulose triacetate were subjected to IR analysis, and then the resultant IR spectra were compared with each other. FIG. 6 shows those IR spectra. It was confirmed from the IR spectra that the resultant cellulose derivative 1 was a cellulose acetate. A hydroxyl group absorption band (3600 $cm^{-1}$) nearly disappeared in the resultant cellulose acetate and hence a degree of substitution (DS) was assumed to be about 3.

Example 22

Derivatization 2 of Polysaccharide

A cellulose derivative 2 was obtained in the same manner as in Example 21 except that 0.35 g of butyl chloride was used instead of acetic anhydride.

Figure 7:
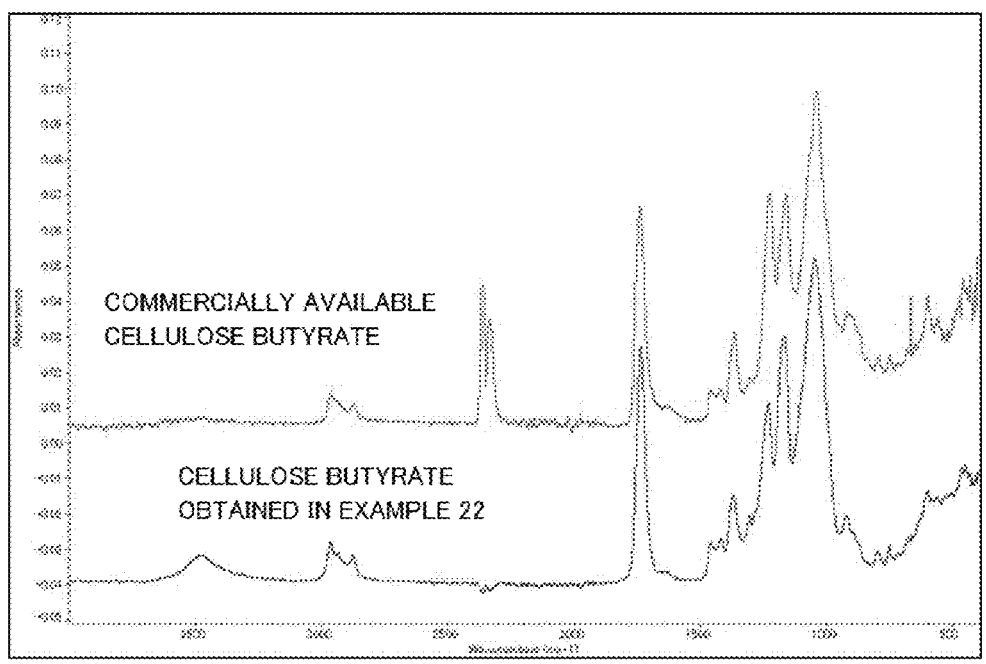
FIG. 7 shows the IR spectra of a cellulose butyrate obtained in Example 22 and a commercially available cellulose butyrate.

The resultant cellulose derivative 2 and a commercially available cellulose butyrate were subjected to IR analysis, and then the resultant IR spectra were compared with each other. FIG. 7 shows those IR spectra. It was confirmed from the IR spectra that the resultant cellulose derivative 2 was a cellulose butyrate. A degree of substitution (DS) was assumed to be about 2 on the basis of the comparison between the IR spectra of the resultant cellulose butyrate and the commercially available butylcellulose.

The resultant cellulose butyrate was soluble in acetone, methanol, and N,N-dimethylacetamide.

INDUSTRIAL APPLICABILITY

As described above, according to the solvent of the present invention, a polysaccharide can be uniformly dissolved within a short time period regardless of the crystal form of the polysaccharide. In addition, according to the solvent, a pretreatment for the polysaccharide like a conventional one becomes unnecessary. In addition, the polysaccharide-containing solution of the present invention has excellent flowability and excellent forming processability. Therefore, the present invention can be applied to a wide variety of technical fields where a polysaccharide-containing solution and a polysaccharide formed article are produced.

The invention claimed is:

1. A solvent to be used for dissolving a polysaccharide, consisting essentially of:
   a tetraalkylammonium acetate represented by the following formula; and
   an aprotic polar solvent,
   wherein a content of the aprotic polar solvent is 35 wt % or more and 72 wt % or less:

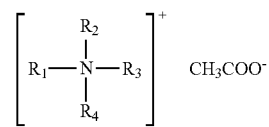

[Chem. 1]

where $R_1$, $R_2$, $R_3$, and $R_4$ each independently represent an alkyl group having 3 to 6 carbon atoms.

2. A solvent according to claim 1, wherein the tetraalkylammonium acetate comprises tetrabutylammonium acetate.

3. A solvent according to claim 1, wherein the aprotic polar solvent has a donor number of 20 to 50.

4. A solvent according to claim 3, wherein the aprotic polar solvent comprises at least one selected from an amide-based solvent, a sulfoxide-based solvent, and a pyridine-based solvent.

5. A solvent according to claim 4, wherein the aprotic polar solvent comprises at least one selected from the group consisting of N,N-dimethylformamide, N,N-diethylformamide, N,N-dimethylacetamide, N,N-diethylacetamide, dimethyl sulfoxide, N-methyl-2-pyrrolidone, N,N'-dimethylpropyleneurea, 1,3-dimethyl-2-imidazolidinone, tetramethylurea, tetraethylurea, pyridine, and 4-methylpyridine, and derivatives thereof.

6. A solvent according to claim 1, wherein the polysaccharide comprises at least one selected from cellulose, hemicellulose, starch, and chitin.

7. A solvent consisting essentially of:
   a tetraalkylammonium acetate represented by the following formula; and
   an aprotic polar solvent comprising at least one selected from the group consisting of N,N-diethylformamide, N,N-dimethylacetamide, N,N-diethylacetamide, dimethyl sulfoxide, N-methyl-2-pyrrolidone, N,N'-dimethylpropyleneurea, 1,3-dimethyl-2-imidazolidinone, tetramethylurea, tetraethylurea, pyridine, and 4-methylpyridine,
   wherein a content of the aprotic polar solvent is 35 wt % or more:

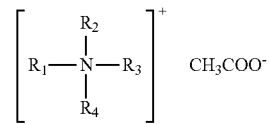

[Chem. 1]

where $R_1$, $R_2$, $R_3$, and $R_4$ each independently represent an alkyl group having 3 to 6 carbon atoms, and
   wherein the solvent is a polysaccharide dissolving agent.

8. A method of dissolving a polysaccharide, the method comprising dissolving a polysaccharide using the solvent of claim 1.

* * * * *